Jan. 28, 1947.    H. E. LUEBBERS    2,415,014

TRACTOR ATTACHMENT MECHANISM

Filed Nov. 16, 1945

Inventor
H. E. LUEBBERS.
By Arthur H. Sturges
Attorney

Patented Jan. 28, 1947

2,415,014

UNITED STATES PATENT OFFICE 2,415,014

TRACTOR ATTACHMENT MECHANISM

Herman E. Luebbers, Fort Dodge, Iowa

Application November 16, 1945, Serial No. 629,042

1 Claim. (Cl. 214—140)

The present invention relates to material moving and handling devices which are attached to tractors and which employ fluid under pressure, pumped by the engine of the tractor, for actuating elongated piston rods employed for elevating the arms of the said devices.

It is an object of the invention to provide a device which is so constructed and the parts thereof are so arranged with respect to each other and with respect to a tractor that the piston rods employed and their adjunct parts operate for the usual purpose as heretofore while at the same time, transverse rotation of said rods with respect to their cylinders is prevented during vertical swinging movements of the said arms.

More particularly it is an object of the invention to provide means for preventing an elongated piston from making rotary movements with respect to its cylinder when used in conjunction with the above stated tractor and the mechanism is assembled in the above stated environment.

Other and further objects of the invention will be understood from the following description thereof.

Figure 1:
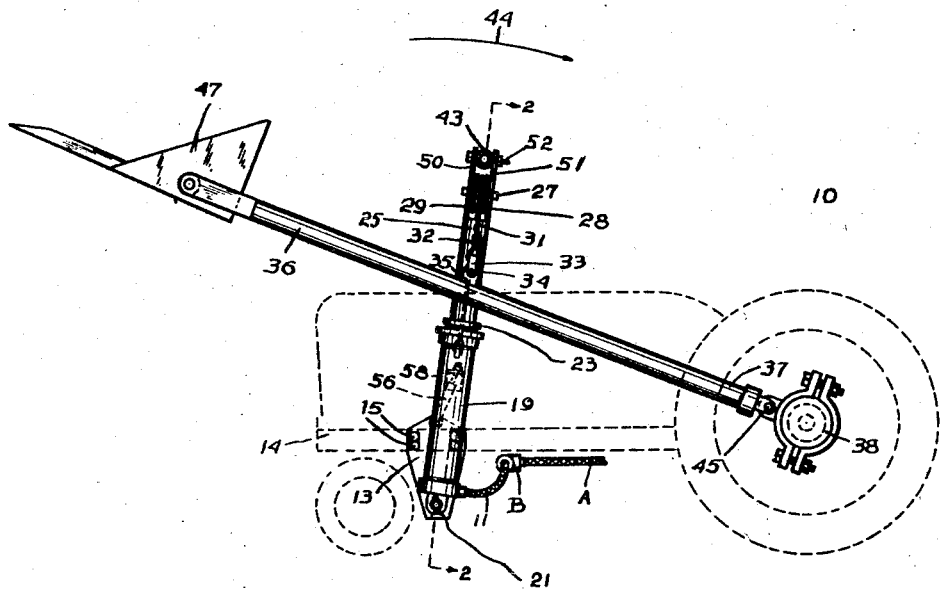

In the drawing Figure 1 is a side view of a tractor, the latter being represented by dotted lines, having a material elevating mechanism attached thereto and showing an embodiment of the present invention cooperatively assembled therewith.

Figure 2:
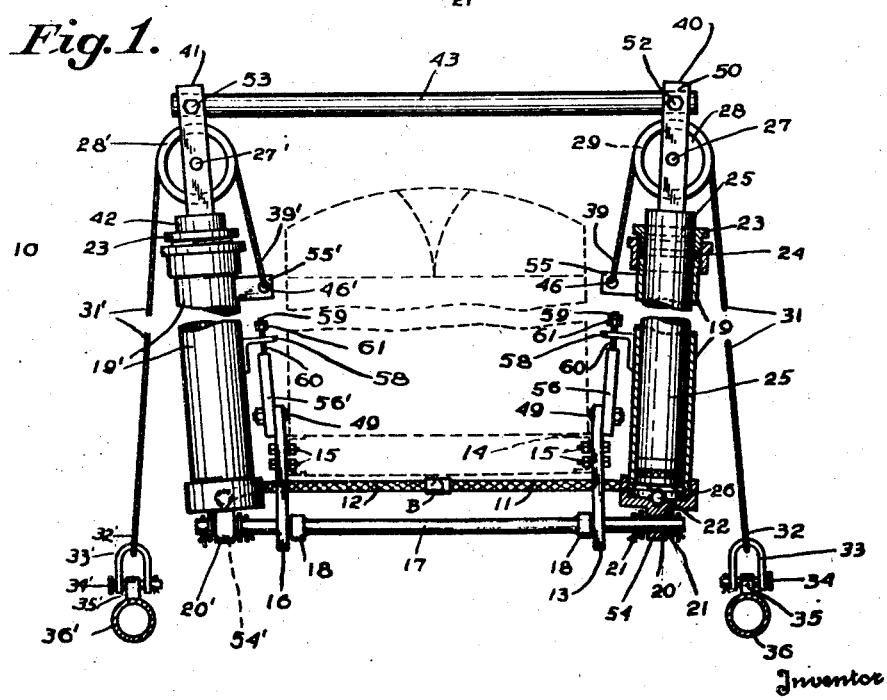

Figure 2 is an elevation of a portion of the front of said tractor, showing a piston of the said mechanism in section and the said embodiment applied thereto in a position of use, the view being taken substantially on line 2—2 of Figure 1.

Referring now to the drawing for a more particular description, 10 generally indicates a tractor of conventional type having an internal combustion engine which also is employed for operating a pump, whereby the latter supplies oil under pressure for actuating numerous selected attachments, such as agricultural implements and including the above mentioned material handling and moving device.

From the outlet of the pump, oil under pressure is supplied to a line pipe A, the latter having a T B whereby the oil under pressure is distributed from the line pump and to two flexible conduits 11 and 12 which extend toward the forward end and to each side of the tractor 10.

As shown in Figure 1 a trunnion-plate 13 is attached to the side rail 14 of the frame of the tractor by any suitable means such as the bolts 15, said plate extending below said frame as shown in Figure 2.

A like trunnion-plate 16, is similarly secured to said frame at the opposite side of the tractor. A shaft 17 is journaled through the lower end portions of the plates and provided with collars 18 for preventing longitudinal sliding movement of the shaft 17.

19 indicates an elongated cylinder having a bushing 20 at the lower end thereof. The bushing 20 is provided with a bore, the diameter of which is complemental to the diameter of the shaft 17 for receiving the latter snugly therein. Cotter pins 21 and washers are provided at each side of the bushing 20 for preventing sliding movements of the latter with respect to the shaft 17 and as thus described it will be seen that the cylinder 19 is free to have swinging movements in a vertical direction since the cylinder 19 is threadedly engaged with said bushing. The bushing is further provided with a passageway 22 for permitting fluid under pressure to enter within the lower end of cylinder 19 from the flexible conduit 11.

The upper end of the cylinder 19 is provided with a pack nut 23 which is threadedly engaged with the said upper end and by rotating the nut 23 the packing 24 becomes squeezed against the annular surface of the piston 25 for preventing a leakage of fluid outwardly of the upper end of said cylinder at times when the oil under pressure is applied to the head 26 of the piston 25 and at the lower end of the latter.

The upper end portion of the piston 25 is bifurcated and provided with a pin 27 for providing a pivotal mounting for a sheave or pulley wheel 28 between the bifurcations or forks of said upper end.

A flexible cable 31 is reeved over the groove 29 of the sheave 28, having an end portion 32 which is attached to a clevis 33, the latter being provided with a pin 34 for attaching the clevis to a lug 35. The lug is welded or otherwise suitably secured to an arm 36, the latter being best shown in Figure 1. The rear end 37 of the arm is pivotally attached to the rear axle housing 38 of the tractor 10, as shown, whereby the arm 36 is swingable in vertical directions in approximate parallelism with the longitudinal axis of the tractor.

The other end portion 39 of the cable 31 is dead ended, as later described, and at times when the piston rod 25 ascends, a corresponding upward movement is applied to the forward free end of the arm 36.

Since it is desired that the arm 36 during an upward movement thereof does not engage against the cylinder 19 and since it is desired that the pulley wheel 28 be comparatively small in diameter, the cylinder 19 is so disposed with respect to the shaft 17 that its upper end is inclined outwardly with respect to the tractor in a manner whereby the upper end of the cylinder 19 is disposed outwardly further than the outer end of the shaft 17 for the said purpose and as shown in Figure 2.

The upper end, or bifurcated end 40, of the piston 25 is connected to the upper end 41 of the oppositely disposed like piston 42 by means of a transversely disposed connecting bar 43 and since the fluid under pressure is applied evenly to the conduits 11 and 12 the pistons 25 and 42 move upwardly simultaneously and coextensively in unison.

During an upward movement of the oppositely disposed pistons for causing a simultaneous upward movement of the oppositely disposed like arms 36 and 36', the cylinders of said pistons, together with the latter, swing in a vertical direction on their pivotal mountings, the latter being provided by the shaft 17, and in the direction of the arrow 44; since as the arms ascend and swing on their pivot pins 45 adjacent the rear axle housing 38, the distance between the pivot pins 45 of the arms and the upper ends of the cylinders 19 and 19' becomes lessened, while the distance between the pivots 45 and the shaft 17 remains constant.

At times when the arms 36 and 36' become lowered, the upper ends of the cylinders swing in a direction reverse to the arrow 44 and away from their pivot pins 45.

Referring to Figure 1, an end of the bar 43 is disposed between the forks 50 and 51 of the piston 25, and a pin or bolt 52 is disposed through said forks and end. The other end of the bar 43 is secured in the same manner between the forks of the piston 41 as represented in Figure 2. It will be seen that since the bar 43 connects the piston rods 25 and 42 together by means of the pivotal bolts or pins 52 and 53 that said bar prevents said pistons from rotating transversely with respect to their cylinders and also prevents said cylinders from transverse movements with respect to each other.

The cylinders being canted outwardly, at times when the pistons slide upwardly with respect to their cylinders and reach the top of their strokes, and the pistons not being disposed in parallelism with respect to each other, the distance between the upper ends of the pistons at the top of their strokes remains the same with respect to the times when said pistons are in a downward position, as shown in Figure 2, since the bar 43 maintains the pistons spaced apart the same distance at all times during operation, and during an upward movement of the pistons the upper ends of the cylinders move toward each other gradually, said movement being permitted since the ends of the shaft 17 are loosely received within the walls of the apertures 54 and 54' of the bushings 20 and 20' respectively.

Since the bar 43 is pivotally attached by the pins 52 and 53 to the upper ends of the piston rods 25 and 42 respectively, compensation is provided for inequalities of the length of the flexible cables 31 and 31' during operation.

Referring to Figure 2, the ends 39 and 39' of the cables 31 and 31' are respectively attached to lugs 55 and 55', said lugs being welded to the exterior walls and adjacent the upper ends of the cylinders 19 and 19' respectively, whereby, during swinging movements of the upper ends of said cylinders, in the direction of the arrow 44, for raising the arms 36 and 36', the dead-ends 39 and 39' of the cables are maintained in alignment with the axis of the cylinders 19 and 19' respectively and with the main body portions 31 and 31' of the said cables, namely those portions of said cables which are disposed at the outer side of said cylinders, and since said alignment is provided, undue wear of the cables while in contact with their respective pulley wheels 28 and 28' is prevented.

The cylinders are made of seamless steel tubing and are of comparatively great length in order that the arms 36 and 36' may be moved upwardly to an angle of approximately forty-five degrees for correspondingly elevating the scoop 47 at the forward ends of said arms for the utilitarian conventional purposes for which said scoop and arms are employed, such as elevating loads of earth, manure, and the like and transporting the said material from place to place.

During an assembly of the above described mechanism upon a tractor it is of advantage to cause the cylinders to be held in an approximately vertical position while reeving the cables over their respective pulley and while attaching the pistons together by means of the bar 43, and for this purpose links 56 and 56' are respectively provided for the cylinders 19 and 19', said links being pivotally attached, as at 49, to their respective trunnion plates 13 and 16.

A clip 58 is welded to the side wall of each cylinder and a stud bolt 59 is disposed loosely through an aperture provided through each clip.

The shanks of the bolts 59 are each provided with a screw thread 60 and are threadedly engaged with the free ends of the links 56 and 56' respectively.

At times when the cylinders are disposed approximately vertical, as shown in Figure 2, the nuts 61 on said shanks are disposed away from their respective clip for permitting the cylinders to swing until the clips engage said nuts for limiting vertical swinging movements in either direction of the cylinders.

During use the detent-nuts 61 are disposed on their stud bolts 59 sufficiently distant from their respective links to permit the upper end of the cylinders to swing only far enough for operative purposes during a sweeping movement upwardly or downwardly of the arms.

During assembly of the mechanism on the tractor, the nuts 61 are initially caused to be moved against the clips 58 for causing the cylinders to remain approximately vertical. After assembly the nuts are then moved toward the free ends of the stud bolts 59 a desired distance for cooperation with the links during swinging movements of the latter on their pivots 49 for limiting the swinging movements of the cylinders in either direction.

The piston rods are of the same diameter throughout their lengths since it is economical to provide the rods of shafting to fit the bores of the cylinders, the latter being of seamless steel tubing, whereby, in the event that the rods are not truly circular throughout their lengths, since said rods are prevented from rotating during sliding movements thereof the packing 24, nevertheless remains compacted against the rods evenly during said sliding for preventing leakage of oil outwardly of the cylinders during operation.

From the foregoing description, it is thought to be obvious that an anti-piston turning mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish it to be understood as limiting myself to the precise arrangement and formation of the several parts herein shown in carrying out my invention in practice, except as claimed.

I claim:

In a fluid under pressure actuated tractor mechanism; an arm disposed at each side of said tractor, ends of said arms being pivotally attached to the rear end of said tractor, the other ends of said arms being disposed forwardly of said tractor for swinging movements in an approximately vertical direction; two cylinders having ends respectively pivotally attached to opposite sides of said tractor adjacent the forward end of the latter, the other ends of said cylinders being vertically swingable in approximate parallelism with respect to said arms; a piston for each cylinder, said pistons having ends disposed outwardly of said cylinders; cables having ends respectively connected to said arms, the other ends of said cables being respectively connected to said outwardly disposed ends of said pistons for raising said arms during a sliding movement of the pistons; and means for limiting swinging movements of said cylinders; said means comprising links having ends pivotally attached respectively to opposite sides of said tractor adjacent the pivotally attached ends of said cylinders, the other ends of each of said links each being provided with a threaded bolt, and an apertured clip secured to the outer wall of each cylinder, said bolts being respectively disposed through said apertures, and a detent-nut on the end of each bolt.

HERMAN E. LUEBBERS.